United States Patent
Imaizumi et al.

(10) Patent No.: US 11,036,804 B1
(45) Date of Patent: Jun. 15, 2021

(54) DEVICE SPECIFIC ADJUSTMENT BASED ON RESOURCE UTILITIES

(71) Applicant: Google LLC, Mountain View, CA (US)

(72) Inventors: Ryoichi Imaizumi, Mitaka (JP); Toshiaki Fujiki, Tokyo (JP); Reiko Hamada, Tokyo (JP)

(73) Assignee: Google LLC, Mountain View, CA (US)

( * ) Notice: Subject to any disclaimer, the term of this patent is extended or adjusted under 35 U.S.C. 154(b) by 628 days.

(21) Appl. No.: 15/492,078

(22) Filed: Apr. 20, 2017

Related U.S. Application Data

(63) Continuation of application No. 14/198,077, filed on Mar. 5, 2014, now Pat. No. 9,652,508.

(51) Int. Cl.
*G06F 16/9038* (2019.01)
*G06F 16/903* (2019.01)

(52) U.S. Cl.
CPC .... *G06F 16/9038* (2019.01); *G06F 16/90335* (2019.01)

(58) Field of Classification Search
CPC ............... G06F 16/9038; G06F 16/90335
See application file for complete search history.

(56) References Cited

U.S. PATENT DOCUMENTS

| | | | |
|---|---|---|---|
| 6,415,281 B1 | 7/2002 | Anderson | |
| 7,617,225 B2 | 11/2009 | Arrouye | |
| 8,086,957 B2 | 12/2011 | Bauchot | |
| 8,326,826 B1 * | 12/2012 | Upstill | G06F 16/24534 707/723 |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 2004/0030882 A1 | 2/2004 | Forman | |
| 2006/0271518 A1 | 11/2006 | Wange | |
| 2007/0209080 A1 | 9/2007 | Ture | |

(Continued)

FOREIGN PATENT DOCUMENTS

| | | |
|---|---|---|
| EP | 2474905 | 7/2012 |
| EP | 2495670 | 9/2012 |

OTHER PUBLICATIONS

Hu et al., "Understanding user's query intent with Wikipedia," Apr. 2009, WWW'09: Proceedings of the 18th International Conference on World Wilde Web, pp. 417-480.*

(Continued)

*Primary Examiner* — Ashish Thomas
*Assistant Examiner* — Jedidiah P Ferrer
(74) *Attorney, Agent, or Firm* — Dority & Manning, P.A.

(57) ABSTRACT

Methods, systems, and apparatus, including computer programs encoded on a computer storage medium, for adjusting search results based on device specific utilities. In one aspect, a method includes determining whether a set of search results are ineligible for an adjustment operation based a query being a navigational query. For each query for which the search results are determined to be eligible for an adjustment operation based on a determination that the query is not a navigational query, the search results are adjusted so that the search results referencing resources in a first proper subset are boosted relative to the search results referencing resources in a second proper subset.

18 Claims, 3 Drawing Sheets

(56) References Cited

U.S. PATENT DOCUMENTS

| | | | |
|---|---|---|---|
| 2008/0013940 A1 | 1/2008 | Jung et al. | |
| 2009/0043749 A1* | 2/2009 | Garg | G06F 16/3338 707/999.005 |
| 2009/0132516 A1* | 5/2009 | Patel | G06F 16/9535 707/999.005 |
| 2009/0319517 A1 | 12/2009 | Guha et al. | |
| 2010/0131538 A1* | 5/2010 | Jones | G06F 16/3338 707/759 |
| 2010/0257466 A1 | 10/2010 | Wroblewski | |
| 2010/0306191 A1 | 12/2010 | LeBeau | |
| 2011/0252038 A1 | 10/2011 | Schmidt | |
| 2011/0270678 A1 | 11/2011 | Drummond et al. | |
| 2011/0314004 A1 | 12/2011 | Mehta | |
| 2011/0314011 A1 | 12/2011 | Buehrer | |
| 2011/0320440 A1 | 12/2011 | McDonal | |
| 2012/0059713 A1 | 3/2012 | Galas | |
| 2012/0124061 A1 | 5/2012 | Macbeth et al. | |
| 2012/0158685 A1 | 6/2012 | White | |
| 2012/0179706 A1 | 7/2012 | Hobbs | |
| 2012/0179955 A1 | 7/2012 | French | |
| 2012/0290584 A1 | 11/2012 | De | |
| 2012/0316955 A1 | 12/2012 | Panguluri et al. | |
| 2012/0323898 A1 | 12/2012 | Kumar | |
| 2013/0006897 A1 | 1/2013 | Jain | |
| 2013/0110815 A1 | 5/2013 | Tankovich | |
| 2013/0111328 A1 | 5/2013 | Khanna | |
| 2013/0122861 A1 | 5/2013 | Kim | |
| 2013/0124606 A1 | 5/2013 | Carpenter | |
| 2013/0191360 A1 | 7/2013 | Burkard | |
| 2013/0232256 A1 | 9/2013 | Lee | |
| 2013/0298007 A1 | 11/2013 | Cullen | |
| 2013/0325856 A1 | 12/2013 | Soto | |
| 2014/0188842 A1 | 7/2014 | Vuong | |
| 2014/0344266 A1 | 11/2014 | Bennett | |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet. URL: people.mozilla.org/~mfinkle/geckoview/docs/org/Mozilla/gecko/GeckoViewContent.html; 4 pages.

"Deeplink.me Lets Mobile Users Navigate Through A "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for A "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages, "Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

\* cited by examiner

DEVICE SPECIFIC ADJUSTMENT BASED ON RESOURCE UTILITIES

CROSS-REFERENCE TO RELATED APPLICATIONS

This application is a continuation of U.S. application Ser. No. 14/198,077, filed Mar. 5, 2014, the contents of which are incorporated by reference herein.

BACKGROUND

This specification describes technologies relating to ranking resources in response to user device queries.

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. With the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Many of these latter types of native applications also have web pages that are descriptive of the native application, such as a product page that can be browsed using a web browser. The product page may include screen shots of the native application, user ratings, and the like.

Search engines now also facilitate searching of the native applications along with web pages. However, some web pages and native applications may be device type specific, and thus have more utility for a particular device type than for other device types. For example, a native application that is provided for only Android based systems, and web pages that describe the native application, may have more utility for devices that run the Android operating system than for other devices that run other operating systems.

SUMMARY

In general, one innovative aspect of the subject matter described in this specification can be embodied in methods that include the actions of receiving search queries submitted from user devices, and for each query a device type identifier that identifies a device type of the device that submitted the query, the device type being one of a plurality of device types, each of the plurality of device types being different from each other device type; for each query: determining a particular device type from the device type identifier of the query, receiving a set of search results that each identify a respective resource determined to be responsive to the query, and wherein each of the identified resources has a corresponding score by which the resource can be ranked in responsiveness to the search relative to other resources, determining whether the set of search results references one or more of a first proper subset of the resources that are determined to have a positive utility for the particular device type, and a second proper subset of the resources that are determined to not have a positive utility for the first device type, determining whether the set of search results is ineligible for an adjustment operation that boosts the search results referencing resources in the first proper subset relative to the search results referencing resources in the second proper subset, the determining including: determining whether the query is a navigational query and determining the search results are ineligible for an adjustment operation when the query is determined to be a navigational query; for each query for which the search results are determined to be eligible for an adjustment operation based on a determination that the query is not a navigational query, adjusting the search results so that the search results referencing resources in the first proper subset are boosted relative to the search results referencing resources in the second proper subset; and for each query for which the search results are determined to not be eligible for an adjustment operation, not adjusting the search results so that the search results referencing resources in the first proper subset are boosted relative to the search results referencing resources in the second proper subset. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter allows the scoring and ranking of resources based on a utility signal that is indicative of the utility of the resource to a particular user device from which a query was received. A set of resources are determined to be responsive to a query and ranked accordingly. However, resources that are determined to be of particularly high utility to a device type of a device that submitted the query are boosted in the scoring and ranking relative to resources that are determined to be of neutral utility and low utility to the device type of the user device. Likewise, resources that are determined to be of particularly low utility to a device type of a device that submitted the query are demoted in the scoring and ranking relative to resources that are determined to be of neutral utility and high utility to the device type of the user device. This increases the likelihood that the search operation will yield resources that satisfy the user's informational need. In some implementations, however, the boosting and/or demoting of resources are conditioned on one or more adjustment criteria being met. Such adjustment criteria are selected to ensure that a user's intent, which may be manifest by the query and/or results, is not overridden by the underlying utility of the resources for the device.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

A system determines whether to adjust search results to be provided to a user device based on the presence of search results that reference resources that are determined to be of positive utility for the user device. Only when search results that reference resources that are determined to be of positive utility for the user device are present within the top N search results are the search results adjusted. Otherwise, the search results are not adjusted according to device-specific utilities. This ensures that search results will only be adjusted when positive utility resources are identified. The absence of positive utility resources will thus preclude the demotion of search results for negative utility resources for a particular device type. This feature recognizes that the absence of positive utility resources can be interpreted as a signal that a user's informational need may not be device specific, and thus a user's informational need may be satisfied by resources that are otherwise determined to have a negative utility for a user's device of a particular device type.

In some implementations, even when search results that reference resources having positive utility are present, other signals can also be used to preclude promotion and demotion of search results. For example, a navigational query may be used to preclude promotion and demotion, as well as a dominant intent of a query. Both are signals that a user's informational need may be independent of the particular utility of resources for a device type.

These features and other features are described in more detail below.

Figure 1:
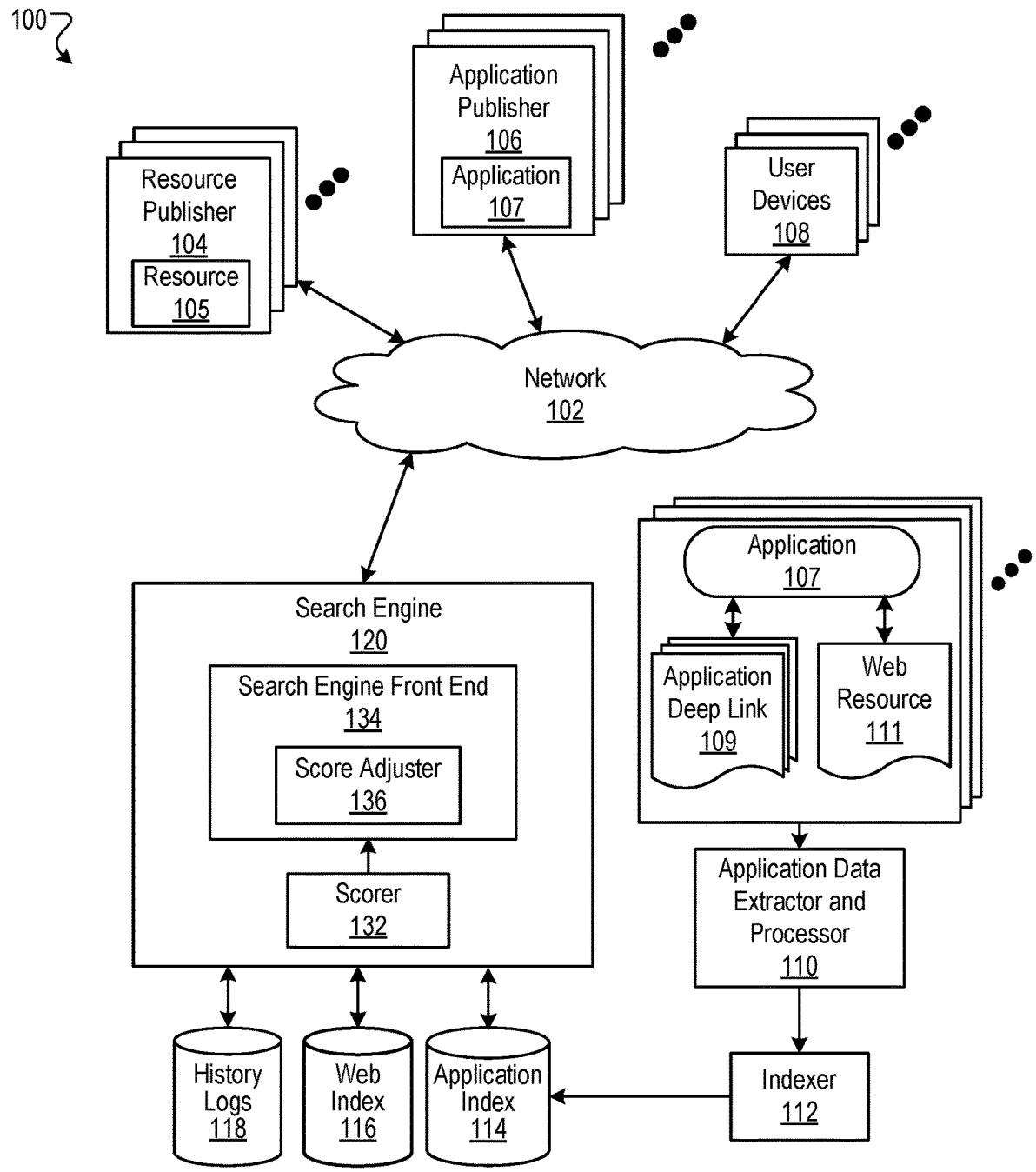
FIG. 1 is a block diagram of an example environment in which device specific adjustments based on resource utilities are made.

FIG. 1 is a block diagram of an example environment 100 in which triggering the search of and the ranking of native applications occurs. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web resources 105 of one or more publisher websites 104 and native applications 107 over the network 102. Example user devices 108 include personal computers, mobile communication devices, and tablet computers.

To search web resources 105 and the native applications 107, the search engine 120 accesses a web index 116 and an application index 114. The web index 116 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 116 and, optionally, the application index 114 to identify resources and applications, respectively, that are relevant to the query. Generally, a first type of search operation implementing a first search algorithm is used to search the index 116, and a second type of search operation implementing a second, different algorithm is used to search the application index 114. The search engine 120 implements a scorer 132 process to score resources. Data describing the resource scores are provided to a search engine front end 134, which includes a score adjuster 136 process. The search engine front end 134 generates search results and provides the search results to the user device 108 that issued the query. The search results may be any type of search result specific to a corpus, such as an image search result, a video search results, a web resource search result, and a native application search result. For brevity, the examples that follow will refer to web resource search results and native application search results; however, many different types of search results for respective different corpora can be used.

A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114. A native application search result may include a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot. Alternatively, a native application search result may include a "purchase" (or "install") command that, when selected, results in a purchase (or free download) and installation of the native application on a user device.

Publishers 106 that provide native applications 107 also provide the deep links 109 to the search engine 120. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

For many native applications 107, there also exist web resources 111 that are descriptive of the native applications 107. One example of such a resource 111 is a product page in an on-line native application store. The product page can be browsed using a web browser, and can be indexed in the web index 116. The product page 111 may include screen shots of the native application, descriptions of user ratings, and the like. Typically the product page 111 is a web page specific to the native application, and is used to facilitate a purchase and/or download of the native application.

Each of the resources referenced by a search result, in some implementations, has one or more device type utility scores that are each indicative of a utility of the resource for a particular device type. As used herein, a "positive utility" means that the resource is determined to be especially useful to the device type relative to other resources and a "negative utility" means that the resource is determined to be less useful to the device type relative to other resources. One resource may have multiple utility scores, each for a different device type. The utility scores can be absolute scores, e.g., a 1 for a positive utility, a −1 for a negative utility, and a 0 otherwise, which indicates a "neutral" resource. Alternatively, the utility scores can be scaled between a maximum and a minimum value, with the maximum value indicating a maximum positive utility, and the minimum value indicating a maximum negative utility, and the value of the score may range from the maximum value to the minimum value, indicating a relative degree of positive or negative utility.

The search engine 120 can receive the utility scores from a third party, or, alternatively, can be programmed to determine the utility scores for the resources. The utility score for each device type for each resource can be determined in a variety of ways. For example, particular resources can be classified as positive for certain device types, or classified as negative. One example is a site that hosts corresponding product pages for applications specific to a first device type. The product pages may each be classified as having a positive utility for the first device type, and a negative utility (or, optionally, neutral utility) for all other device types.

Another way to determine resource utility is by user behavior. For example, the queries submitted from user devices 108, and selection data for the queries and the resources referenced by the search results and selected by users may be stored in history logs 118. The search engine 120 may access the history logs 118 to map queries submitted by user devices to resources that were identified in search results and the actions taken by users when presented with the search results in response to the queries. The selection logs 118 can thus be used by the search engine to determine the respective sequences of queries submitted by the user devices, the device types that submitted the queries, and the actions taken in response to the queries. Resources that exhibit a very high selection rate for a particular device type relative to other resources may be assigned a positive utility value for that device type. Conversely, resources that exhibit a very low selection rate for a particular device type relative to other resources may be assigned a negative utility value for that device type.

A variation of this implementation involves mapping keywords to device types, and corresponding clicks for the keywords. For example, by examining the aggregate behavior of users, the search engine 120 can determine specific keywords that are indicative of positive utility (and negative utility) for corresponding device types. To illustrate, the keyword "droid" may have a very high selection rate for device types that operate the Android operating system, but a relatively low selection rate for users that operate devices of other device types. Thus, the keyword "droid" may be associated with a positive utility for the device type "Android," but may be associated with a negative utility for other device types.

Another way to determine resource utility is by the content of the resource. For example, native applications may have manifests that clearly identify an operating system with which the native application is compatible. Web pages may have content specific to a particular device type, such as a web page entitled "Android OS Help" that includes content specific to the Android operating system.

Another way to determine resource utility is by entity mapping of entities referenced in the resource. Such an entity is a topic of discourse, such as concepts or things that can be referred to by a text fragment, e.g., a term or phrase, and are distinguishable from one another, e.g., based on context. Entities may be mapped in a graph and connected by entity relations, such as in the case of a knowledge graph. By comparing the entities described in a resource to lists of device-type specific entities, a corresponding utility score for the recourse can be determined.

Other appropriate ways to determine utility scores for resources can also be used. These resource utility scores can be stored in the indexes 114 and 116.

The search engine front end 134 includes the score adjuster 136 that processes the utility scores of the resources referenced by the search results and determines whether to adjust the resource search scores based on the corresponding utility scores. The process of the score adjuster 136 is described with reference to FIGS. 2-4 below.

Figure 2:
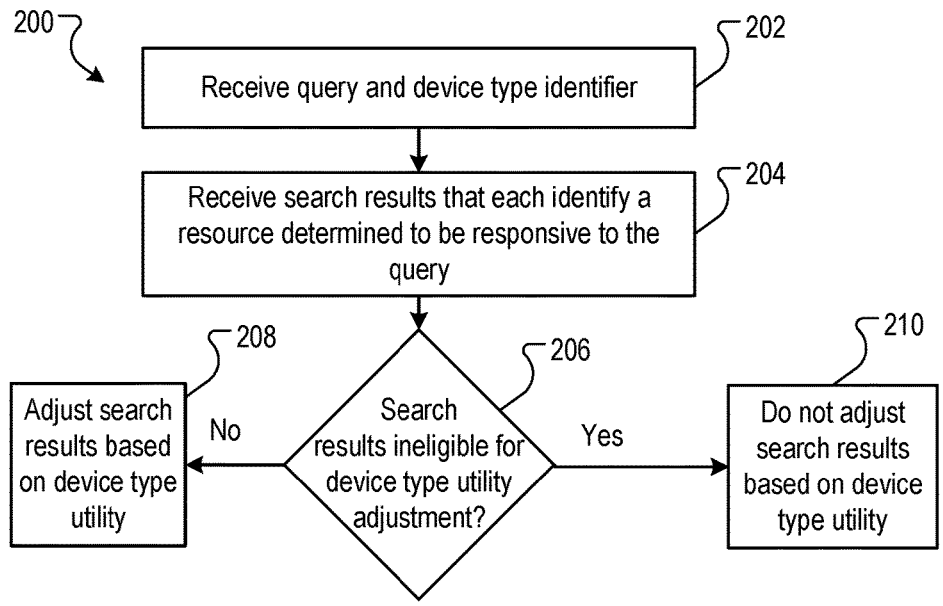
FIG. 2 is a flow diagram of an example process for processing a query and search results for device specific utilities.

FIG. 2 is a flow diagram of an example process 200 for processing a query and search results for device specific utilities. The process 200 can be implemented in a data processing apparatus, such as the data processing apparatus that is used to implement the search engine 120 and the score adjuster 136. The process 200 is done for each query received from a device.

The process 200 receives a query and a device type identifier (202). Each query typically includes text, such as one or more query terms, and additional information, such as a device type identifier that identifies a device type of the device that submitted the query. Because there are multiple different device types, the device type that is identified is one of a many device types.

The process 200 receives search results that each identify a resource determined to be responsive to the query (204). The search results are ordered according to the search scores of the underlying resources. Each of the identified resources has a corresponding score by which the resource can be ranked in responsiveness to the search query relative to the other resources.

The process 200 determines whether the search results are ineligible for a device type utility adjustment (206). The determination is independent of the presence of resources that are determined to have a negative utility for device types that issued the query. The determination is described in more detail with reference to FIGS. 3 and 4 below.

If the search results are eligible for the device type adjustment, then the process 200 adjusts the search results based on the device type (208). For example, search results for resources with a positive utility are boosted relative to search results for resources with a negative utility. The boosting can, for example, involve boosting positive utility search results and demoting negative utility search results in proportion to their respective utility scores for the device type that matches the device type of the user device. To illustrate, assume a resource has a positive utility for device type "A" and a negative utility for device type "B." For a search query provided from a user device of device type "A," the search result will be boosted. Conversely, for a search query provided from a user device of device type "B," the search result will be demoted.

The boosting or demotion may, in some implementations, be limited to a subset of the top N or bottom N resources of the respective utility values, and may only be done for the top Q search results. For example, assume in a search result set of Q=200, there is a first proper subset of 5 referenced resources with a positive utility at ordinal positions 3, 5, 22, 19 and 31, and a second proper subset of four referenced resources with a negative utility at positions 4, 12, 14, and 17, and that N=3. The search results at the ordinal positions of 3, 5 and 22 would be boosted in the ranking, and the search results at the ordinal positions 12 14, and 17 would be demoted in the ranking. The adjustments to the scores may be scaled so that demotions and promotions are a fixed amount of ordinal positions. Conversely, the adjustments to the scores may not necessarily result in fixed adjustment, and may be dependent on the underlying search score and a scaling factor that is proportional to a utility value. Other adjustment techniques can also be used.

Once adjusted, the search results are provided to the user device that issued the query according to the adjusted order.

If, however, the search results are not eligible for the device type adjustment, then the process 200 does not adjust the search results based on the device type (210). The search results may be adjusted for other factors, however, before being provided to the user device that issued the query.

Figure 3:
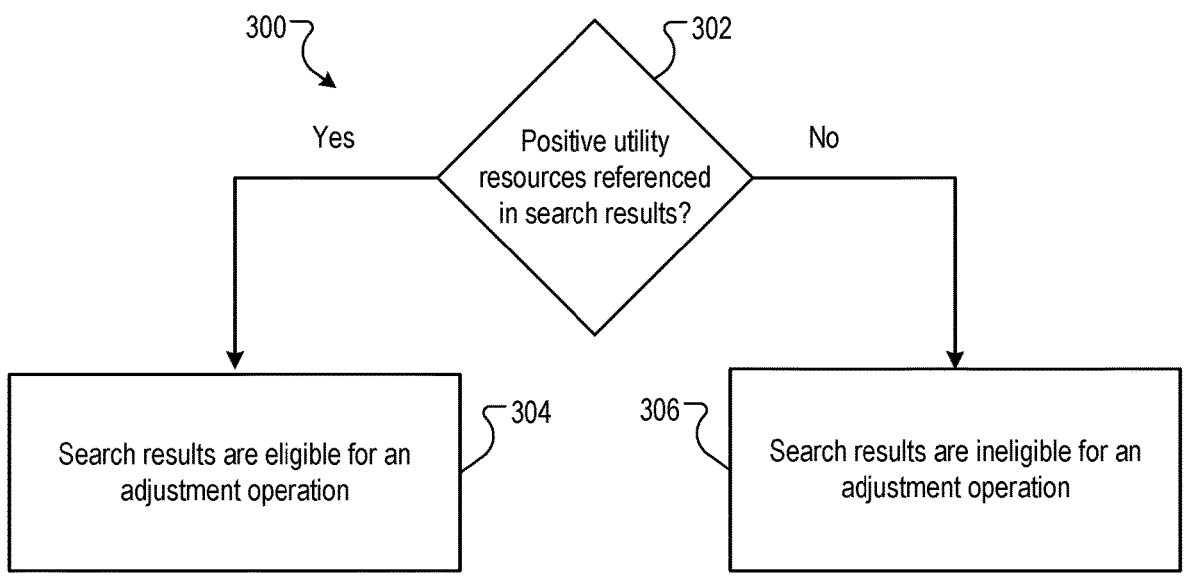
FIG. 3 is a flow diagram of an example process for adjusting search results based on device specific utilities.

FIG. 3 is a flow diagram of an example process 300 for adjusting search results based on device specific utilities. The process 300 can be implemented in a data processing apparatus, such as the data processing apparatus that is used to implement the search engine 120.

The process 300 determines whether there are positive utility resources referenced by the search results (302). For example, in a set of the top Q ranked search results, the score adjuster 134 determines whether any of the search results reference positive utility resources based on the utility scores of the resources that correspond to the device type of the device that issued the query. In some implementations, the score adjuster determines the device type of the user device that issued the query from the device type identifier of the user device, and, using this identifier, accesses, for each resource, a corresponding utility score for that device type. Each resource may have a positive utility score, a negative utility score, or no utility score for the particular device type.

If there are positive utility resources referenced by the search results, then the search results are eligible for an adjustment operation (304). In such a situation, the adjustments as described above may occur. If, however, there are no positive utility resources referenced by the search results, then the process 300 determines the search results are ineligible for an adjustment operation (306). The search results may be adjusted for other factors, however, before being provided to the user device that issued the query.

The absence of positive utility resources will thus preclude the demotion of search results for negative utility resources for a particular device type. This feature recognizes that the absence of positive utility resources can be interpreted as a signal that a user's informational need may not be device specific, and thus a user's informational need may be satisfied by resources that are otherwise determined to have a negative utility for a user's device of a particular device type.

Figure 4:
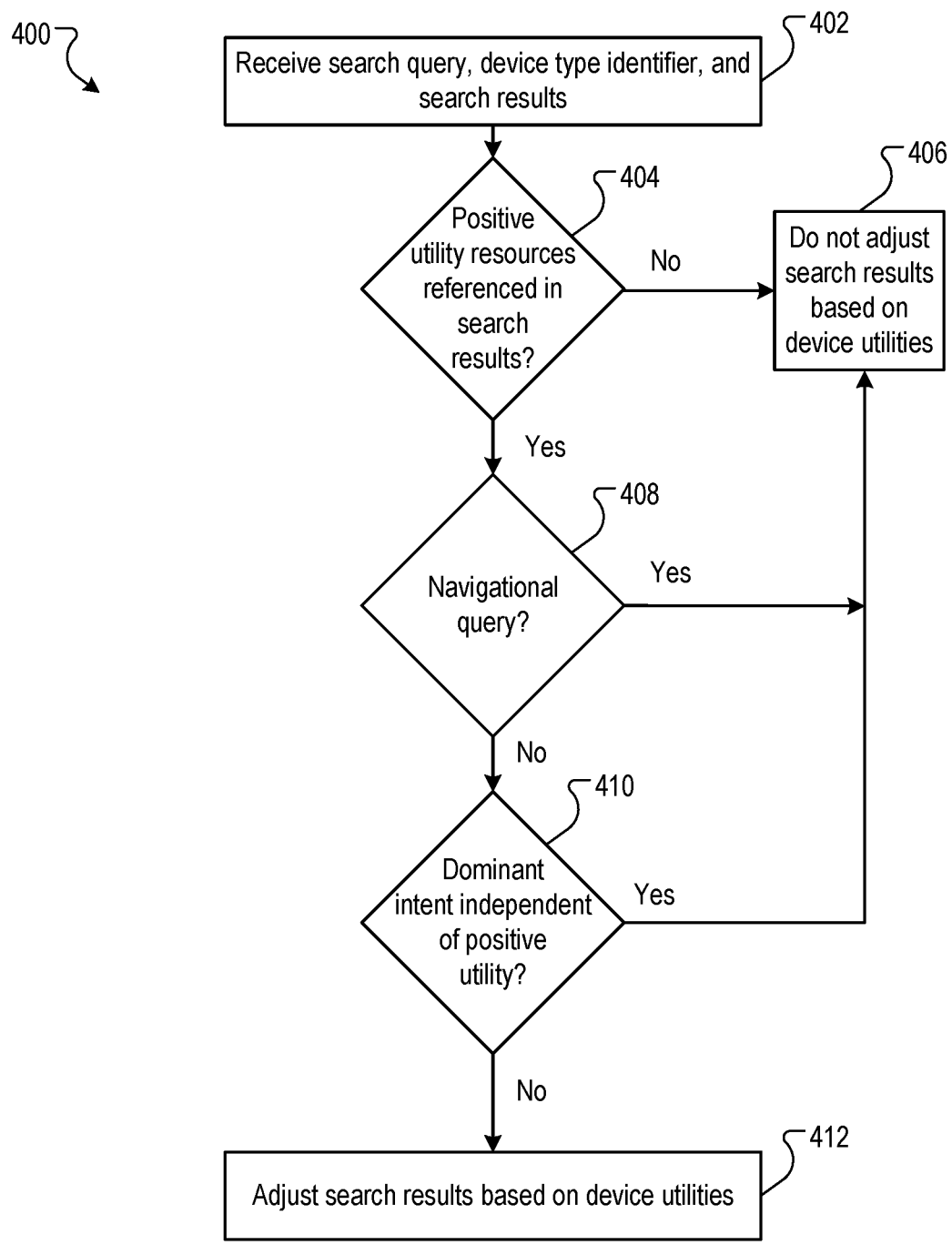
FIG. 4 is a flow diagram of an example process for determining whether to adjust search results based on device utilities.

As described above, even when search results that reference resources having positive utility are present, other signals can also be used to preclude promotion and demotion of search results. For example, a navigational query may be used to preclude promotion and demotion, as well as a dominant intent of a query. Both are signals that a user's informational need may be independent of the particular utility of resources for a device type. An example of a more robust adjustment preclusion process is shown in FIG. 4, which is a flow diagram of an example process 400 for determining whether to adjust search results based on device utilities. The process 400 can be implemented in a data processing apparatus, such as the data processing apparatus that is used to implement the search engine 120.

The process 400 receives a search query, a device type identifier, and search results responsive to the query (402). Each query typically includes text, such as one or more query terms, and additional information, such as a device type identifier that identifies a device type of the device that submitted the query.

The process 400 determines whether positive utility resources are referenced in search results (404). This process step is similar the process step 302 of FIG. 3.

If there are no positive utility resources referenced in the search results, then the process 400 does not adjust search results based on device utilities (406). The search results may be adjusted for other factors, however, before being provided to the user device that issued the query.

Conversely, if there are positive utility resources referenced in the search results, then the process 400 determines if the query is a navigational query. A navigational query is a query for which the intent is to find a particular resource of a website. Typically a navigational query has a small number of resources that are highly relevant to the query relative to all other resources. A navigational query is determined from navigation metrics of resources identified by a search engine in response to the query. Example navigation metrics include cross linkage of resources referenced by the search results responsive to the query, the click-through rates of the search results, the proportion of search result selection traffic to particular resources referenced by the search results, and other metrics. Such data may be pre-processed so that navigational queries can be immediately identified as such by the search engine 120.

If the query is a navigational query, then the process 400 does not adjust search results based on device utilities (406). Because a user's intent may be clear from the navigational query, the adjustment of search results based on device utilities is not desired. This is because there may be the case that the resource that is responsive to the navigational query has a low utility score for the user device. For example, a user may desire information on a new native application that has been released for a device of a different device type than that used by the user, and thus a product page for the native application may have a negative utility for the user's device. However, because the user's intent to navigate to the product page is clear from the query, a search result referencing the product page will not be demoted. Likewise, a user may desire information about a particular website for which the corresponding resources have a neutral utility. Additionally, there may be other resources that have a positive utility. However, promoting the search results for the resources with the positive utility may result in a search result that references the home page of the web site being demoted. Once again, because the user's intent to navigate to the website home page is clear from the query, a search result referencing another resource will not be promoted, thereby precluding demotion of the search result most useful to the user.

If, however, the query is not a navigational query, then the process 400 determines whether the query has a dominant intent that is independent of the positive utility of the resources responsive to the query (410). A query has a dominant intent for a subject when the terms of the query specify the particular instance subject in an unambiguous way. For example, a query may specify a particular device name instead of a class to which the device belongs, such as [Droid device] instead of [mobile device], a name of a native application instead of a classification to which the native application belongs, such as the title of a financial application instead of [personal finance apps], etc. While these queries may not be navigational, they nevertheless clearly specify a particularly narrow and distinct subject.

If there are responsive resources that have a positive utility, but none of the positive utility resources correspond to the dominant intent of the query, then the query has a dominant intent that is independent of the positive utility of the resources responsive to the query. A resource corresponds to the dominant intent of the query if, for example, the resource score meets a threshold score, e.g. is within the top K ranked resources, where K is a 20, 30, or some other value; or if the resource includes keywords that are highly relevant to the query terms that specify the particular instance of the subject; or by some other appropriate criterion. Because the user's intent is clear from the query, a search result referencing another resource that is not reflective of the dominant intent will not be promoted, thereby precluding demotion of search results that might be more useful to the user. Thus, if the query has a dominant intent that is independent of the positive utility of the resources responsive to the query, then the process 400 does not adjust search results based on device utilities (406).

If, however, the query does has a dominant intent that is independent of the positive utility of the resources responsive to the query, then the process 400 does adjust the search results based on device utilities (412).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
 receiving search queries submitted from user devices and, for each query, a device type identifier that identifies a device type of the user device that submitted the query, the device type being one of a plurality of device types, each of the plurality of device types being different from each other device type;
 for each query:
  determining a first device type of the user device that submitted the query from the device type identifier of the query;

receiving a set of search results that each identify a respective resource determined to be responsive to the query, and wherein each of the identified resources has a corresponding score by which the resource can be ranked in responsiveness to the search relative to other resources;

determining, based on the first device type of the user device that submitted the query, whether the set of search results references one or more of a first proper subset of the resources that are determined to have a positive utility for the first device type, and a second proper subset of the resources that are determined to not have a positive utility for the first device type;

determining whether the set of search results is ineligible for an adjustment operation that boosts the search results referencing resources in the first proper subset relative to the search results referencing resources in the second proper subset, the determining including:

determining, based on navigation metrics of resources identified by a search engine in response to the query, whether the query is a navigational query that indicates an intent to identify a particular resource of a website; and determining the search results are ineligible for an adjustment operation when the query is determined to be a navigational query;

for each query for which the search results are determined to be eligible for an adjustment operation based on a determination that the query is not a navigational query, adjusting the search results so that the search results referencing resources in the first proper subset are boosted relative to the search results referencing resources in the second proper subset; and for each query for which the search results are determined to be ineligible for an adjustment operation based on a determination that the query is a navigational query, not adjusting the search results so that the search results referencing resources in the first proper subset are boosted relative to the search results referencing resources in the second proper subset.

2. The computer-implemented method of claim 1, wherein the first proper subset of the resources is determined to have a positive utility for the first device type in response to each of the resources being categorized as corresponding to the first device type and not categorized as corresponding to a second device type.

3. The computer-implemented method of claim 2, wherein the second proper subset of the resources is determined not to have a positive utility for the first device type in response to each of the resources being categorized as corresponding to the second device type and not categorized as corresponding to the first device type.

4. The computer-implemented method of claim 2, wherein adjusting the search results comprises increasing search scores of the resources in the first proper subset relative to the scores of the resources in the second proper subset.

5. A system, comprising:

a data processing apparatus that includes one or more hardware processors and a non-transitory computer readable storage medium storing instructions executable by the data processing apparatus and that upon such execution cause the data processing apparatus to perform operations comprising:

receiving search queries submitted from user devices and, for each query, a device type identifier that identifies a device type of the user device that submitted the query, the device type being one of a plurality of device types, each of the plurality of device types being different from each other device type;

for each query:

determining a first device type of the user device that submitted the query from the device type identifier of the query;

receiving a set of search results that each identify a respective resource determined to be responsive to the query, and wherein each of the identified resources has a corresponding score by which the resource can be ranked in responsiveness to the search relative to other resources;

determining, based on the first device type of the user device that submitted the query, whether the set of search results references one or more of a first proper subset of the resources that are determined to have a positive utility for the first device type, and a second proper subset of the resources that are determined to not have a positive utility for the first device type;

determining whether the set of search results is ineligible for an adjustment operation that boosts the search results referencing resources in the first proper subset relative to the search results referencing resources in the second proper subset, the determining including:

determining, based on navigation metrics of resources identified by a search engine in response to the query, whether the query is a navigational query that indicates an intent to identify a particular resource of a website; and determining the search results are ineligible for an adjustment operation when the query is determined to be a navigational query;

for each query for which the search results are determined to be eligible for an adjustment operation based on a determination that the query is not a navigational query, adjusting the search results so that the search results referencing resources in the first proper subset are boosted relative to the search results referencing resources in the second proper subset; and for each query for which the search results are determined to be ineligible for an adjustment operation based on a determination that the query is a navigational query, not adjusting the search results so that the search results referencing resources in the first proper subset are boosted relative to the search results referencing resources in the second proper subset.

6. The system of claim 5, wherein the first proper subset of the resources is determined to have a positive utility for the first device type in response to each of the resources being categorized as corresponding to the first device type and not categorized as corresponding to a second device type.

7. The system of claim 6, wherein the second proper subset of the resources is determined not to have a positive utility for the first device type in response to each of the resources being categorized as corresponding to the second device type and not categorized as corresponding to the first device type.

8. The system of claim 5, wherein adjusting the search results comprises increasing search scores of the resources in the first proper subset relative to the scores of the resources in the second proper subset.

9. A non-transitory computer readable storage medium storing instructions executable by a data processing apparatus and that upon such execution cause the data processing apparatus to perform operations comprising:
receiving search queries submitted from user devices and, for each query, a device type identifier that identifies a device type of the user device that submitted the query, the device type being one of a plurality of device types, each of the plurality of device types being different from each other device type;
for each query:
determining a first device type of the user device that submitted the query from the device type identifier of the query;
receiving a set of search results that each identify a respective resource determined to be responsive to the query, and wherein each of the identified resources has a corresponding score by which the resource can be ranked in responsiveness to the search relative to other resources;
determining, based on the first device type of the user device that submitted the query whether the set of search results references one or more of a first proper subset of the resources that are determined to have a positive utility for the first device type, and a second proper subset of the resources that are determined to not have a positive utility for the first device type;
determining whether the set of search results is ineligible for an adjustment operation that boosts the search results referencing resources in the first proper subset relative to the search results referencing resources in the second proper subset, the determining including:
determining, based on navigation metrics of resources identified by a search engine in response to the query, whether the query is a navigational query that indicates an intent to identify a particular resource of a website; and
determining the search results are ineligible for an adjustment operation when the query is determined to be a navigational query;
for each query for which the search results are determined to be eligible for an adjustment operation based on a determination that the query is not a navigational query, adjusting the search results so that the search results referencing resources in the first proper subset are boosted relative to the search results referencing resources in the second proper subset; and
for each query for which the search results are determined to be ineligible for an adjustment operation based on a determination that the query is a navigational query, not adjusting the search results so that the search results referencing resources in the first proper subset are boosted relative to the search results referencing resources in the second proper subset.

10. The non-transitory computer readable storage medium of claim 9 wherein the first proper subset of the resources is determined to have a positive utility for the first device type in response to each of the resources being categorized as corresponding to the first device type and not categorized as corresponding to a second device type.

11. The non-transitory computer readable storage medium of claim 10, wherein the second proper subset of the resources is determined not to have a positive utility for the first device type in response to each of the resources being categorized as corresponding to the second device type and not categorized as corresponding to the first device type.

12. The non-transitory computer readable storage medium of claim 9, wherein adjusting the search results comprises increasing search scores of the resources in the first proper subset relative to the scores of the resources in the second proper subset.

13. The computer-implemented method of claim 1,
wherein the determination that the query is a navigational query is based on the intent indicated by the query without reference to a particular utility of: i) the first proper subset of the resources for the first device type and ii) the second proper subset of the resources for the first device type.

14. The computer-implemented method of claim 1, wherein the navigational query is a signal indicating that one or more informational needs of a user are to be determined independent of a particular utility of resources for the first device type.

15. The computer-implemented method of claim 1, comprising:
for each of the identified resources:
generating, based on the first device type of the user device that submitted the query, the corresponding score by which the resource can be ranked in responsiveness to the search relative to other resources.

16. The system of claim 5,
wherein the determination that the query is a navigational query is based on the intent indicated by the query without reference to a particular utility of: i) the first proper subset of the resources for the first device type and ii) the second proper subset of the resources for the first device type.

17. The system of claim 5, wherein the navigational query is a signal indicating that one or more informational needs of a user are to be determined independent of a particular utility of resources for the first device type.

18. The system of claim 5, wherein the operations comprise:
for each of the identified resources:
generating, based on the first device type of the user device that submitted the query, the corresponding score by which the resource can be ranked in responsiveness to the search relative to other resources.

* * * * *